R. J. CHURCHILL.
BROOM CORN HEADER.
APPLICATION FILED JUNE 9, 1910.
980,203.
Patented Jan. 3, 1911.
2 SHEETS—SHEET 2.
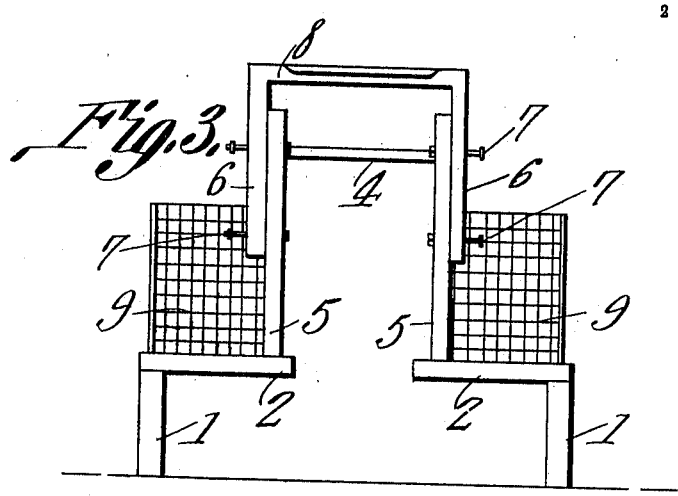
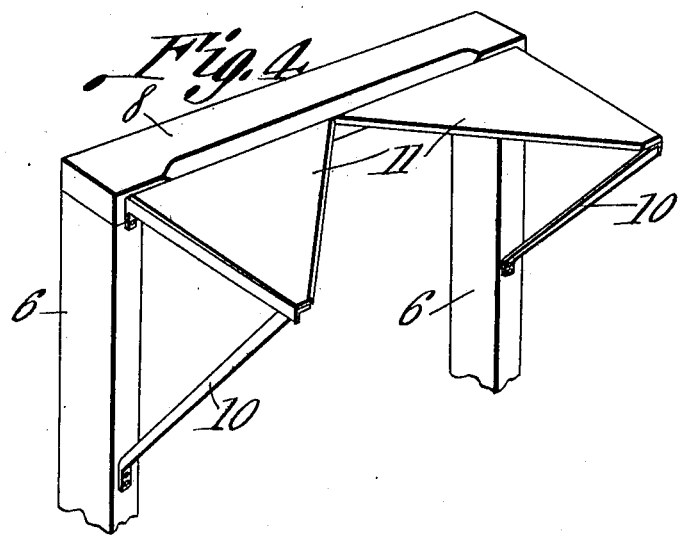
Witnesses
Richard J. Churchill,
Inventor
by C. A. Snow & Co.
Attorneys

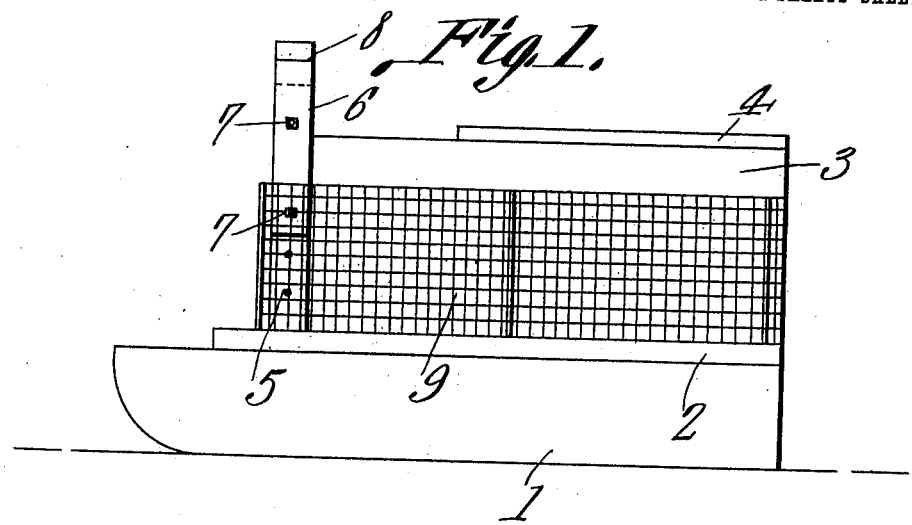
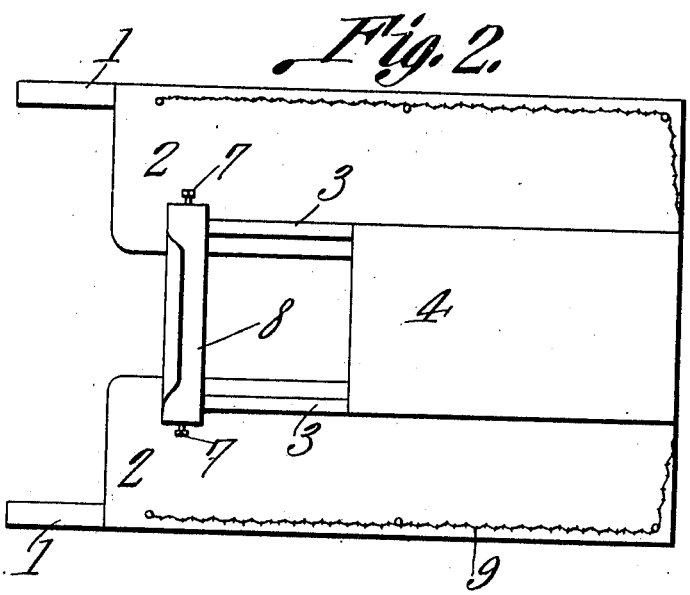

UNITED STATES PATENT OFFICE.

RICHARD J. CHURCHILL, OF ESSEX, KANSAS.

BROOM-CORN HEADER.

980,203.     Specification of Letters Patent.     Patented Jan. 3, 1911.

Application filed June 9, 1910. Serial No. 565,944.

*To all whom it may concern:*

Be it known that I, RICHARD J. CHURCHILL, a citizen of the United States, residing at Essex, in the county of Finney and State of Kansas, have invented a new and useful Broom-Corn Header, of which the following is a specification.

This invention relates to a broom corn header and it consists in the novel construction and arrangement of its parts as hereinafter shown and described.

The object of the invention is to provide a header of simple structure having a bar adjustably mounted thereon and against which the heads of the corn may be held during the time that the heads are pulled from the stalks or severed by cutting blades which may be provided. At the same time, the structure is provided with receptacles into which the detached heads may be placed and thus the heads are collected as the device is drawn along a row of plants.

In the accompanying drawings,—Figure 1 is a side elevation of the broom corn header. Fig. 2 is a top plan view of the same. Fig. 3 is a front end elevation of the same. Fig. 4 is a detail perspective view of the adjustable bar of the header showing cutting blades applied thereto.

The header consists of runners 1 having platforms 2 attached to their upper edges. The inner edges of the said platforms are spaced from each other and form a stalk passage. Vertically disposed side pieces 3 are mounted upon the inner edge portions of the platforms 2 and the rear end portions of the said side pieces 3 are connected together by a top piece 4 which bridges the space between the inner edges of the platforms 2 and is located at a sufficient distance above the said platforms to permit the headed stalks to pass thereunder.

Standards 5 are mounted upon the forward end portions of the platforms 2 at the forward ends of the side pieces 3 and standards 6 are adjustably mounted upon the said standards 5 and are secured in adjusted positions by means of bolts 7 which pass transversely through the standards 5 and 6. The upper ends of the standards 6 are connected together by means of a cross bar 8 and vertically disposed nettings 9 are located at the outer edge portions of the platform 2 and are spaced from the side pieces 3. The spaces between the said nettings 9 and the side pieces 3 form receptacles into which the heads of corn as they are removed from the stalks may be deposited.

In operation as the device is drawn along a row of stalks an operator standing upon one of the platforms 2 grasps the heads of corn and bends the same over the cross bar 8. Then as the device continues to proceed along the row the draft strain is applied directly along the stalks and the heads are pulled from the stalks. The heads thus severed are thrown by the operator into the space between one of the nettings 9 and one of the side pieces 3 of the device.

In some cases it may be desired to cut the heads from the stalks and when the heads are to be so removed brackets 10, as shown in Fig. 4 are secured to the end portions of the cross bar 8 and the upper part of the standards 6 and cutting blades 11 are supported upon the upper ends of the said brackets and against the forward edge of the said cross bar 8 in the manner as illustrated in Fig. 4 of the drawing. The cutting edges of the blades 11 converge toward each other at the intermediate portion of the cross bar 8 and as the device is drawn along a row of plants the operator grasps the heads as above described and brings the sides of the stalks back against the cutting edges of the blades 11. Therefore as the device continues to proceed along the row of stalks the draft strain is applied to the stalks in the manner as indicated and the cutting edges of the blades 11 sever the heads from the lower portions of the stalks. The heads thus removed are cast back into one of the receiving spaces between one of the side pieces 3 and one of the nettings 9. Therefore it will be seen that a simple device is provided in which the heads to be removed from the stalks are manually positioned preparatory to being removed from the stalks and during the operation of removing the heads of the stalks, the force is transmitted directly through the device from the draft animals moving the same to the stalks and thus the operator is in a great measure relieved of the manual exertion of pulling the heads from the stalks. At the same time means is provided for accumulating the detached heads and the accumulated heads are carried along with the device.

Having described the invention what I claim as new and desire to secure by Letters Patent is:—

A header comprising a structure having a stalk passage located between its opposite side portions, upright standards located at the opposite sides of the forward end portion of said stalk passage, and a cross bar located transversely of the stalk passage and secured at its ends to said standards, the parts being so arranged that the entire forward end of the stalk passage below the cross bar is unobstructed, so that the said cross bar may act as a puller for the heads of standing rooted plants which are bent over the same as the bar passes over the stalks of the plants.

In testimony that I claim the foregoing as my own, I have hereto affixed my signature in the presence of two witnesses.

RICHARD J. CHURCHILL.

Witnesses:
E. G. FINNUP,
L. H. HILL.